US012709038B2

(12) United States Patent
Martin et al.

(10) Patent No.: US 12,709,038 B2
(45) Date of Patent: Aug. 18, 2026

(54) REMOVABLE DISC AND CUTTING TOOL INCORPORATING SAME

(71) Applicants: Raymond Lee Martin, Marinette, WI (US); Steven R. Geniesse, Marinette, WI (US)

(72) Inventors: Raymond Lee Martin, Marinette, WI (US); Steven R. Geniesse, Marinette, WI (US)

(73) Assignee: Great Lakes Custom Tool Mfg., Inc., Peshtigo, WI (US)

( * ) Notice: Subject to any disclaimer, the term of this patent is extended or adjusted under 35 U.S.C. 154(b) by 384 days.

(21) Appl. No.: 18/462,243

(22) Filed: Sep. 6, 2023

(65) Prior Publication Data

US 2025/0073937 A1 Mar. 6, 2025

(51) Int. Cl.
*B26D 1/143* (2006.01)
*G09F 3/02* (2006.01)
*B26D 1/00* (2006.01)

(52) U.S. Cl.
CPC ............... *B26D 1/143* (2013.01); *G09F 3/02* (2013.01); *B26D 2001/0046* (2013.01)

(58) Field of Classification Search
CPC ............ B26D 1/143; B26D 2001/0046; B24B 45/00–006; B24B 23/022; G09F 3/02; B23C 2210/244; B27B 5/32; B27B 5/30
USPC ................... 83/469, 508.2, 15–18, 664–666, 83/698.41–698.61; 407/45, 31; 411/554, 411/160, 187, 532–533; 30/329, 388
See application file for complete search history.

(56) References Cited

U.S. PATENT DOCUMENTS 7,517,178 B2 4/2009 Martin
2010/0040474 A1* 2/2010 Takahashi ............. B24B 45/006 416/219 R
2016/0074948 A1* 3/2016 Dudzinsky .............. B23C 5/006 407/11
2016/0175950 A1* 6/2016 Stadtfeld ............... B23C 5/2295 407/51

FOREIGN PATENT DOCUMENTS

CN 206590047 U * 10/2017
WO WO-2015075001 A1 * 5/2015 ............... B27B 5/32

OTHER PUBLICATIONS

CN-206590047-U, Translation (Year: 2026).*

* cited by examiner

*Primary Examiner* — Nhat Chieu Q Do
(74) *Attorney, Agent, or Firm* — Reinhart Boerner Van Deuren P.C.

(57) ABSTRACT

An apparatus includes a shaft having a first and a second end. A cutter head is mounted on the shaft. An endcap has a removable indicia plate mounted at the second end. The endcap includes an endcap body defining a through-hole extending from a first open end of first inner diameter to a second open end of a second inner diameter less than the first inner diameter. An inner wall surrounds the through-hole defined by the endcap body. An annular channel is in the inner wall receiving at least a portion of a retaining member. A first step is in the inner wall. The first step receives the indicia plate. A second step is in the inner wall. The second step defines mounting through-holes evenly spaced around a center axis of the through-hole. Fasteners extend through mounting holes to secure the endcap to the cutter head.

2 Claims, 15 Drawing Sheets

REMOVABLE DISC AND CUTTING TOOL INCORPORATING SAME

FIELD OF THE INVENTION

This invention generally relates to cutting tools for machine tools and more particularly to rotatory cutting tools.

BACKGROUND OF THE INVENTION

Machine tools with rotary cutting heads are used in industrial manufacturing to remove material from a workpiece. Typically, the material removed is wood, metal or composite. The rotary cutter heads can be made up of one or more stacked cutters. Some rotary cutter heads can weigh between 10 and 50 pounds and are designed to rotate at high speeds. High-speed machining is usually associated with any spindle speed above 3,000 revolutions per minute (rpm). Rotary cutter heads must be balanced for rotation. Indeed, the balancing is particularly important for rotary cutting heads that turn at such high speeds. Whether designed to operate at high-speeds or not, the rotary cutter heads must be balanced to ensure they can achieve the necessary tolerances demanded for the workpiece. Additionally, the high-speed rotary cutting head must be assembled such that it does not come apart when subjected to the forces of rotation and material removal. Industrial machine tools utilizing rotary cutting heads and high-speed rotary cutting heads may include, for example, milling machines, routers, moulders, shapers, or tenoners.

Removing material from a workpiece typically involves two relative motions apart from the depth being cut. They are the cutting motion and the feed motion. Tool carriages, or spindles carrying a tool, typically move right or left while the cutting tool being carried can rotate clockwise or counterclockwise. For example, a right-handed cutting tool can remove material while the carriage moves leftward. Left-handed cutting tools can remove material while the carriage moves rightward.

Rotary cutting tools can have cutting knives made up of costly material such as steel, carbide, polycrystalline diamond, or other well-known blade materials. Therefore, it is imperative that the rotary cutting head is placed in the spindle of the machine tool in the correct orientation to avoid both the premature wear and replacement of the cutting knives on the rotatory cutting head and to prevent damage to the part being machined.

Unfortunately, machine operators at times are not experienced enough to know, by merely looking at the rotary cutting tool, whether it is a right handed or left-handed rotary cutting tool or the size of the rotary cutting tool they need for the machining they are about to undertake. Utilizing the wrong orientation or the wrong size rotary cutting tool can increase production costs because of damage done to either the rotary cutting head or the workpiece and because of the lost time in labor which is directed to repair or replacement of the workpiece or rotary cutting tool.

BRIEF SUMMARY OF THE INVENTION

The invention provides a removable indicia plate for a rotary cutting tool that may identify properties of the rotary cutting tool for a user of the cutting tool so the user can select the proper tool to use in a machining process and that may also identify for the user, the proper orientation of the cutting tool for mounting to a machine tool. These and other advantages of the invention, as well as additional inventive features, will be apparent from the description of the invention provided herein.

In one aspect, the invention provides a rotary cutter head that includes a cutter head body oriented for rotation about a rotational axis. The cutter head body includes a first face, a second face opposite the first face, and a cutter face extending between the first face and the second face. A recess is defined in the first face and a removable indicia plate is mounted in the recess.

In one aspect, the invention provides an apparatus that includes a shaft having a first end and a second end opposite the first end. The apparatus includes a rotary cutter head that is a high-speed rotary cutter head mounted on the shaft between the first end and the second end. The apparatus includes an endcap having a removable indicia plate mounted at the second end of the shaft.

In another aspect, the invention provides an endcap for a high-speed rotary cutter head mounted on a shaft for mounting to a machine tool. The endcap includes an endcap body that defines an annular inner wall surrounding a through-hole defined by the endcap body. The annular inner wall includes an annular channel in the inner wall. The endcap includes a retaining member and a removable indicia plate. The removable indicia plate is mounted within the through-hole in the endcap body and is removably secured therein by the retaining member. By removably secured, it is meant the retaining member, such as a snap ring, can be easily removed by a user without having to break a weldment.

In an embodiment, the first end is a driven end.

In an embodiment, the first end includes a spindle mounting groove.

In an embodiment, the endcap includes an endcap body. The endcap includes an annular cylindrical outermost radial surface defined by the endcap body. The endcap includes an annular frustoconical outermost radial surface defined by the endcap body. The annular frustoconical outermost radial surface extends from the annular cylindrical outermost radial surface to an axial outermost surface of a bottom of the endcap.

In an embodiment, the endcap includes an endcap body defining a through-hole extending from a first open end of first inner diameter to second open end of a second inner diameter less than the first inner diameter.

In an embodiment, the endcap includes an annular inner wall surrounding a through-hole defined by the endcap body. The endcap includes an annular channel in the inner wall. The annular channel receives at least a portion of the snap ring therein. The other portion abuts the removable indicia plate to sandwich the removable indicia plate between the snap ring and the annular first step of the endcap.

In an embodiment, an annular first step is defined in the annular inner wall. The annular first step is sized to receive the removable indicia plate thereon.

In an embodiment, an annular second step defined in the annular inner wall, the annular second step defining a plurality of mounting through-holes evenly spaced around a center axis of the through-hole of the endcap.

In an embodiment, at least two fasteners extending through two mounting holes of the plurality of mounting holes secure the endcap to the high-speed rotary cutter head.

In an embodiment, the annular second step receives a shaft-cap thereon.

In an embodiment, the annular second step is sandwiched between the shaft-cap and the high-speed rotary cutter head. An axially outermost surface of the annular second step is in direct contact with the high-speed rotary cutter head.

In an embodiment, a center through-hole is defined by the shaft-cap. The center through-hole is axially aligned with a blind hole at the second end of the shaft. A cap fastener secures the shaft-cap to the shaft as it extends through the center hole and the blind hole.

In an embodiment, the snap ring removably secures the removable indicia plate inside the endcap.

In an embodiment, the indicia plate is sandwiched between the snap ring and the first step of the endcap.

In an embodiment, the apparatus is structured to rotate at greater than 3,000 revolutions per minute.

In an embodiment, the annular cylindrical outermost radial surface and the annular frustoconical outermost radial surface form a handle portion of the apparatus.

In an embodiment, the shaft and the high-speed cutter head are made of steel or aluminum and the endcap is made of steel or aluminum.

In an embodiment, the removable indicia plate is made of plastic.

In an embodiment, a color of the removable indicia plate is indicative of a property of the apparatus or the rotary cutter head.

In an embodiment, the indicia plate includes a laser cut marking visible to a user of the apparatus or the rotary cutter head.

In an embodiment, the laser cut marking is indicative of a property of the apparatus or the rotary cutter head.

In an embodiment, the annular inner wall defines an annular channel and an annular first step. The retaining member is seated in the annular channel such that an annular portion of the retaining member is in the channel, and another annular portion of the retaining member bears against the removable indicia plate to sandwich the removable indicia plate between the retaining member and the annular first step.

In an embodiment, a bottom of the endcap includes a plurality of mounting holes providing mounting areas for fasteners extending therethrough to fix the endcap to a shaft of a high-speed rotary cutting head.

In an embodiment, the recess is a blind hole.

In an embodiment, the recess is a ring-shaped channel.

In an embodiment, the recess is surrounded by an annular inner wall defined by the cutter head body.

In an embodiment, an annular channel is defined in the annular inner wall.

In an embodiment, the annular channel receives at least a portion of a retaining member for retention of the removable indicia plate therein.

In an embodiment, the retaining member is a snap ring.

In an embodiment, the removable indicia plate is sandwiched between and in contact with the retaining member and a bottom surface of the recess.

In an embodiment, the removable indicia plate is washer-shaped with a center through-hole. The removable indicia plate is received in the annular channel such that a radial face at an innermost diameter of the removable indicia plate is in contact with the cutter head body in the recess and at least a portion of a second radial face at an outermost diameter of the removable indicia plate is in contact with the cutter head body in the recess.

In an embodiment, the recess defines a center axis. The recess surrounds the rotational axis such that the rotational axis of the rotary cutter head and the center axis are on a same axis.

In an embodiment, the recess defines a center axis. The rotational axis of the rotary cutter head and the center axis are parallel and spaced apart from one another but are not on a same axis.

In an embodiment, the removable indicia plate includes a color or marking indicative of a property of the rotary cutter head.

In an embodiment, the marking is a laser cut marking.

In an embodiment, the first face defines a plane, and the removable indicia plate does not extend axially from the recess through the plane.

In an embodiment, the rotary cutter head is a high-speed rotary cutter head.

In an embodiment, another recess defines another central axis. The another recess is spaced apart from the recess by 180 degrees. The another center axis, the rotational axis, and the center axis are parallel and spaced apart from one another such that they are not on a same axis.

Other aspects, objectives, and advantages of the invention will become more apparent from the following detailed description when taken in conjunction with the accompanying drawings.

BRIEF DESCRIPTION OF THE DRAWINGS

The accompanying drawings, incorporated in and forming a part of the specification, illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications, and equivalents as included within the spirit and scope of the invention as defined by the appended claims.

DETAILED DESCRIPTION OF THE INVENTION

Figure 1:
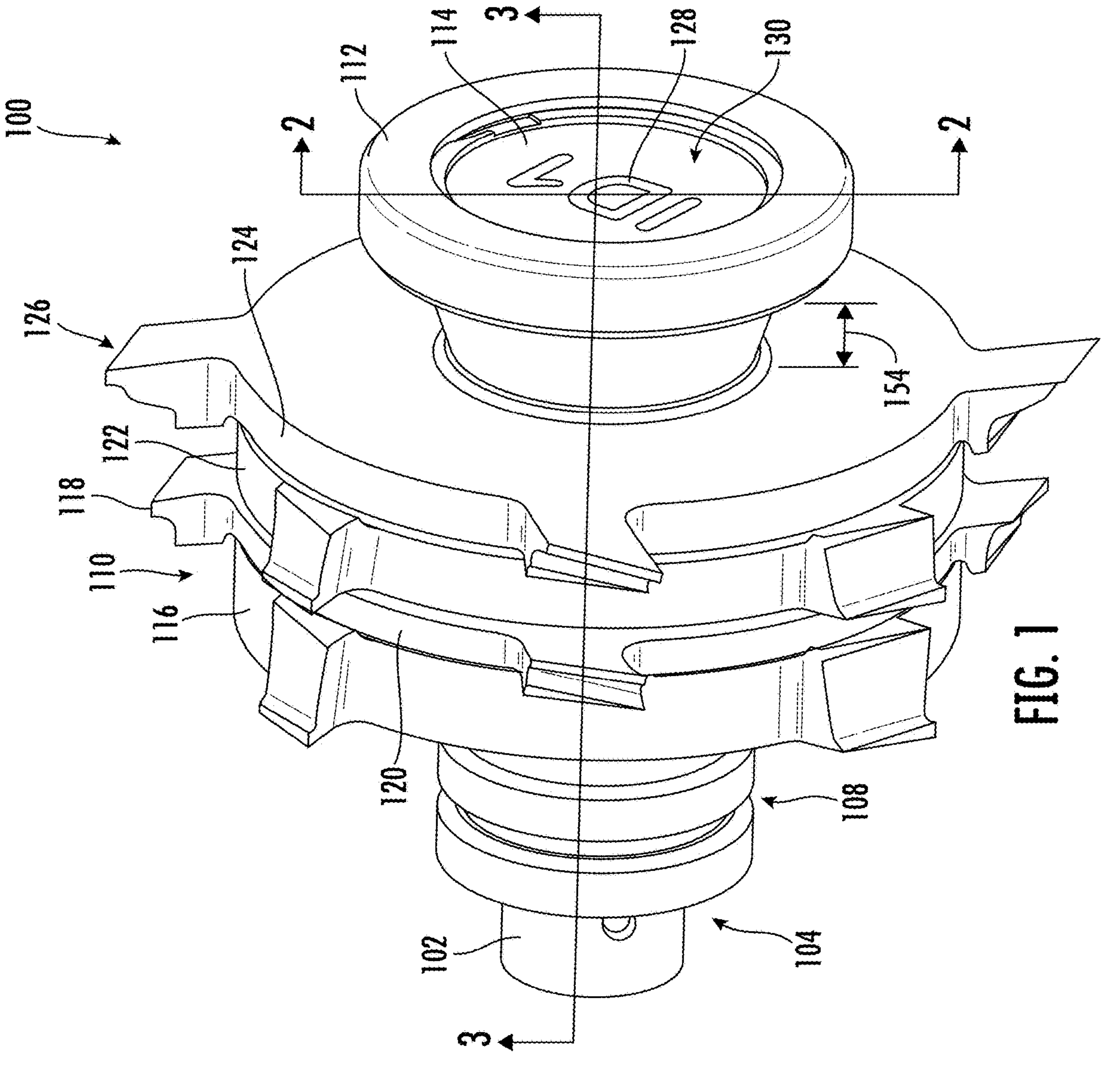
FIG. 1 is a perspective view of an apparatus according to the teachings of the instant application.

FIG. 1, illustrates an apparatus 100 according to the teachings of the instant invention. The apparatus 100 includes a shaft 102. The shaft 102 has a first end 104 and a second end 106 opposite the first end 104. The first end 104 is a driven end having a spindle mounting groove 108 to facilitate the apparatus 100 being held by a spindle (not illustrated) of a machine tool (not illustrated).

A high-speed rotary cutter head 110 is mounted on the shaft 102 between the first end 104 and the second end 106. An endcap 112 having a removable indicia plate 114 is mounted at the second end 106. By "high-speed" it is meant the apparatus 100 is structured and assembled to withstand the forces associated with rotating at 3,000 revolutions per minute (rpm) or more while removing material from a workpiece (not illustrated).

The high-speed rotary cutter head 110 may include a cutter body 116 with knives 118 making up the high-speed rotary cutter head 110. Alternatively, as illustrated, the high-speed rotary cutter head 110 may include more than one cutter body 116, 120, 122, 124 that are stacked together, and which have a plurality of knives 126 for removing material.

The shaft 102 and the high-speed cutter head 110 are in a preferred embodiment made of steel and the endcap 112 is made of steel or aluminum. However, other embodiments can have a high-speed cutter head 110 and endcap 112 made up of other material, for example steel composites. The removable indicia plate 114 is preferably made of plastic but can be made of inexpensive metallic or composite material. Plastic is preferred because it can be marked with indicia 128 such as words, letters, numbers, or marks or symbols. The marks may be, for example, directional arrows or trademarks via laser cutting, engraving or marking. Further, the plastic can be of a color such as red, blue, green, or yellow by way of non-limiting example. Thus, a user can visually see the indicia 128 on the removable indicia plate 114 and know some of the properties of the apparatus 100, for example, the part number, or color indicative of a particular machine tool, or other properties such as whether it is a right or left-handed high-speed rotary cutter head 110.

Accordingly, with the indica 128 a less experienced user/machine operator is less likely to make costly mistakes in using the wrong high-speed cutter head 110. Thus, with the indicia 128, a property 130 of the apparatus 100 is readily understood. For example, property 130 can be a directional arrow or initials "CCW" or both, thereby letting the user know that the apparatus 100 is meant to cut in while turning in a counterclockwise direction.

Other properties of the apparatus are also possible, for example, by way of non-limiting example, such properties may be weight, ownership, location, or part number to name just a few of the many possibilities. Another apparatus might have a removable indicia plate 114 that is red. The red color can indicate, for example, the apparatus is meant to turn clockwise or have another property as decided by the user. Moreover, as will be discussed, an owner or operator can easily remove the removable indicia plate 114 and insert another with different indicia if desired.

Figure 2:
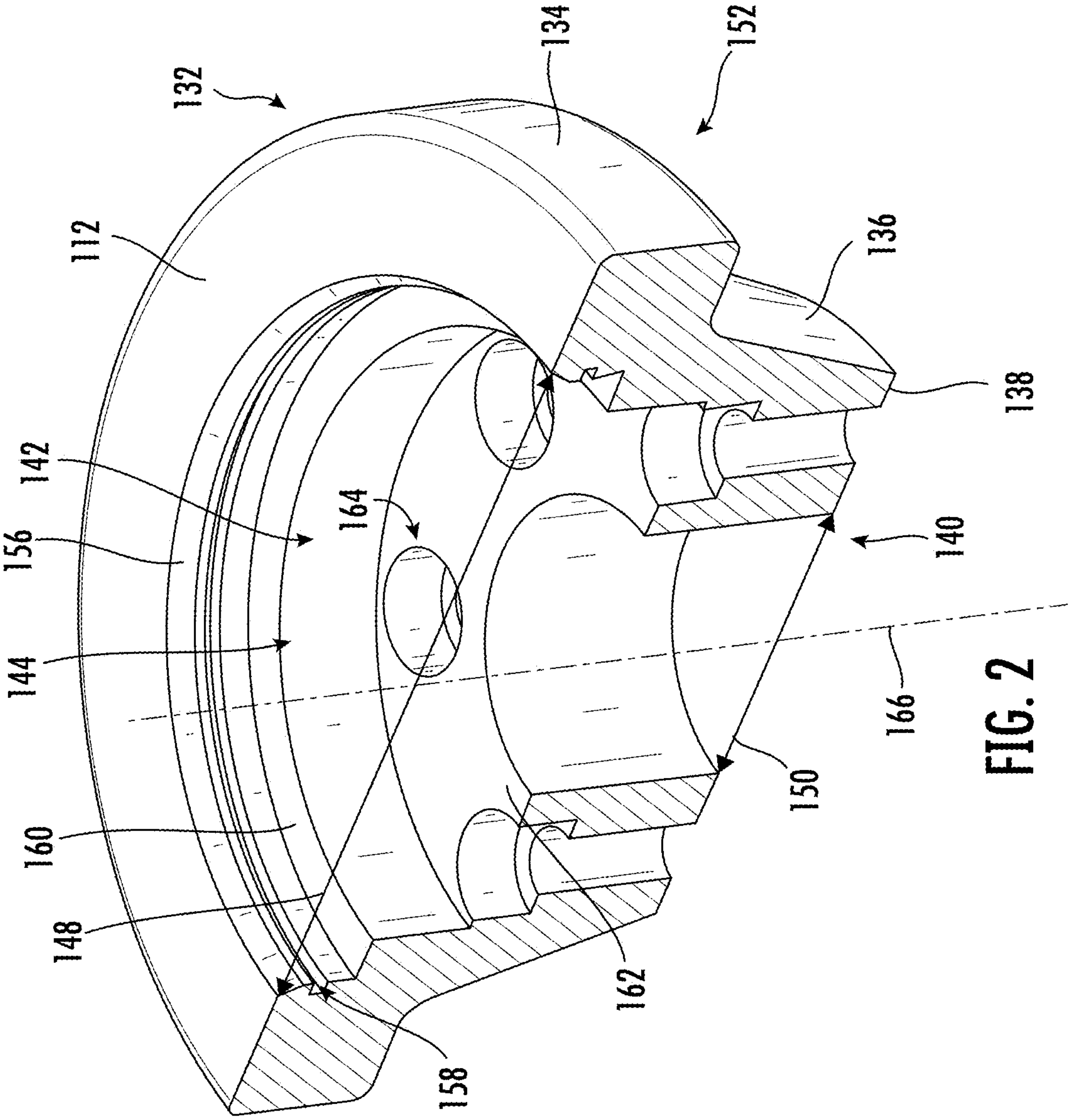
FIG. 2 is a partial cross section of the endcap of the apparatus of FIG. 1 taken about the line 2-2 of FIG. 1.

Turning to FIG. 2, the endcap 112 with the removable indicia plate 114 (FIG. 1) removed is shown in cross section. The endcap 112 has an endcap body 132. An annular cylindrical outermost radial surface 134 is defined by the endcap body 132. An annular frustoconical outermost radial surface 136 is defined by the endcap body 132. The annular frustoconical outermost radial surface 136 extends from the annular cylindrical outermost radial surface 134 to an axial outermost surface 138 of a bottom 140 of the endcap 112.

The endcap body 132 defines a through-hole 142 extending from a first open end 144 of the endcap 112 to a second open end 146 of the endcap 112. The first open end 144 has a first inner diameter 148. The second open end 146 has a second inner diameter 150 that is less than the first inner diameter 148. The annular cylindrical outermost radial surface 134 and the annular frustoconical outermost radial surface 136 form a handle portion 152 of the apparatus 100. The handle portion 152 is circumferentially large enough to permit a user to apply a five-finger grip to the handle portion 152. Turning back to FIG. 1, the five-finger grip is necessary due to the weight of the apparatus 100 (FIG. 1). Moreover, a gap 154 (FIG. 1) between the high-speed rotary cutter head 110 and the endcap 112 is large enough to permit a user is easily able to insert their fingers in the gap 154 to ensure a strong enough grip can be exerted to lift the apparatus 100.

Returning to FIG. 2, the endcap body 132 defines an annular inner wall 156 surrounding the through-hole 142 defined by the endcap body 132. An annular channel 158 in the annular inner wall 156 receives a portion of a retaining member 159 (FIG. 3) which may be a snap ring therein. Other retaining members cooperating with the annular inner wall 156 can be used, for example removable fasteners. However, given the high-speed of rotation the endcap body 160 is designed to rotate at, it is important that the retaining member 159 be balanced. Indeed, a snap ring that, for example, is not annular would be problematic as the gap therein would leave the retaining member unbalanced. An annular first step 160 is defined in the annular inner wall 156. The annular first step 160 is sized to receive the removable indicia plate 114 (FIG. 1) thereon.

An annular second step 162 defined in the annular inner wall 156. The annular second step 162 defines a plurality of mounting through-holes 164 evenly spaced around a center axis 166 of the through-hole 142 of the endcap 132.

Figure 3:
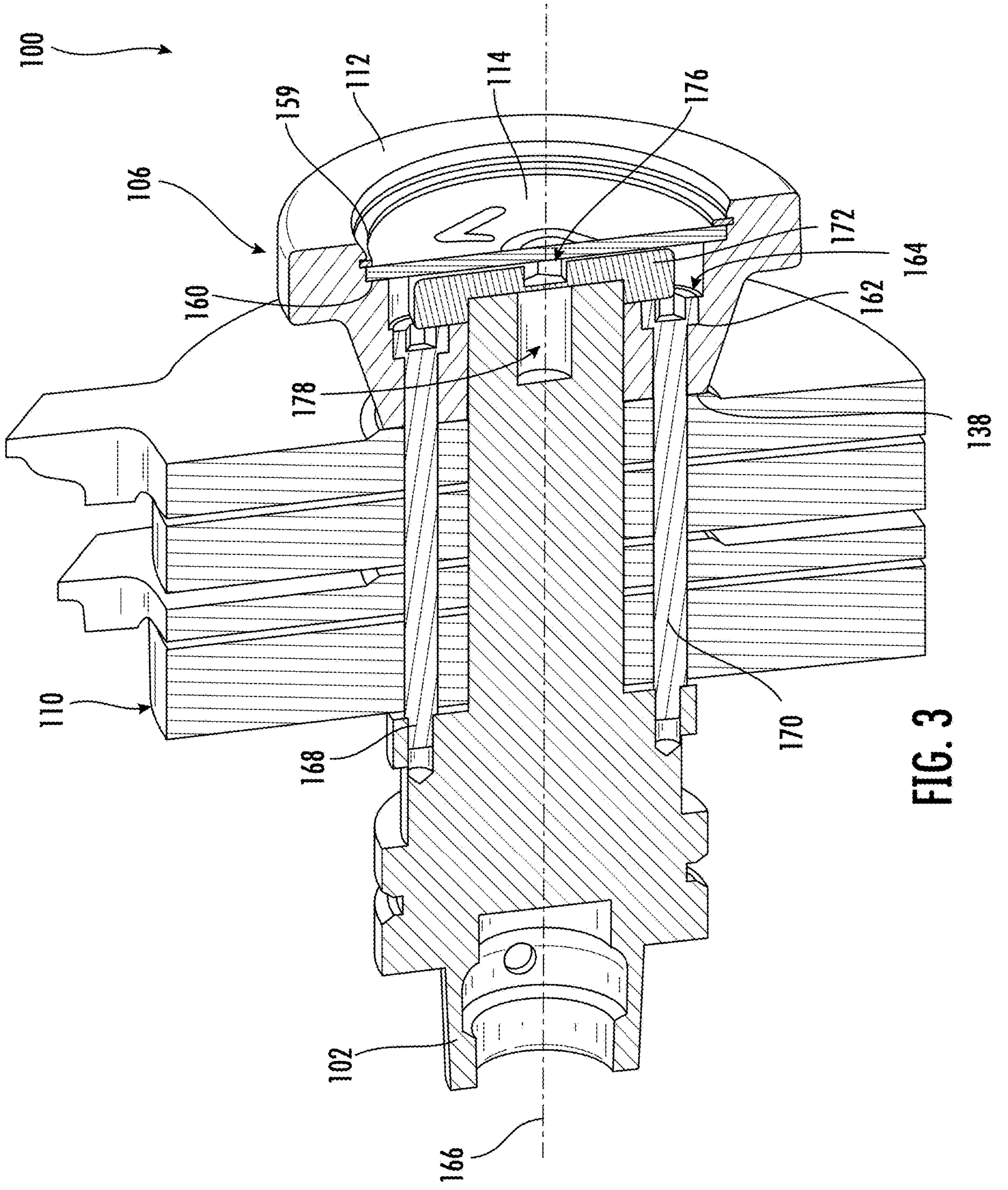
FIG. 3 is a cross section of the apparatus of FIG. 1 taken about the line 3-3.

Turning to FIG. 3, at least two fasteners 168, 170 extending through two mounting holes of the plurality of mounting holes 164 secure the endcap 112 to the high-speed rotary cutter head 110. The annular second step 162 receives a shaft-cap 172 thereon. The annular second step 162 is sandwiched between the shaft-cap 172 and the high-speed rotary cutter head 110. The axially outermost surface 138 of the annular second step 162 is in direct contact with the high-speed rotary cutter head 110. By axially, it is meant with respect to center axis 166.

A center through-hole 176 is defined by the shaft-cap 172. The center through-hole 176 is axially aligned with a blind hole 178 at the second end 106 of the shaft 102. A cap fastener secures the shaft-cap 172 to the shaft 102 as it extends through the center through-hole and the blind hole 178. The cap fastener may be a threaded screw. The snap ring 159 removably secures the removable indicia plate 114 inside the endcap 112. Thus, the removable indicia plate 114 is sandwiched between the snap ring 159 and the annular first step 160 of the endcap 132. Thus, the structure of the endcap 132 together with its mounting to the shaft 112 and to the high-speed rotary cutting head 110 is provided by the instant invention so as to permit a heretofore unknown removable indicia plate 114 to be used in the apparatus 100 for high-speed machining.

Figure 4:
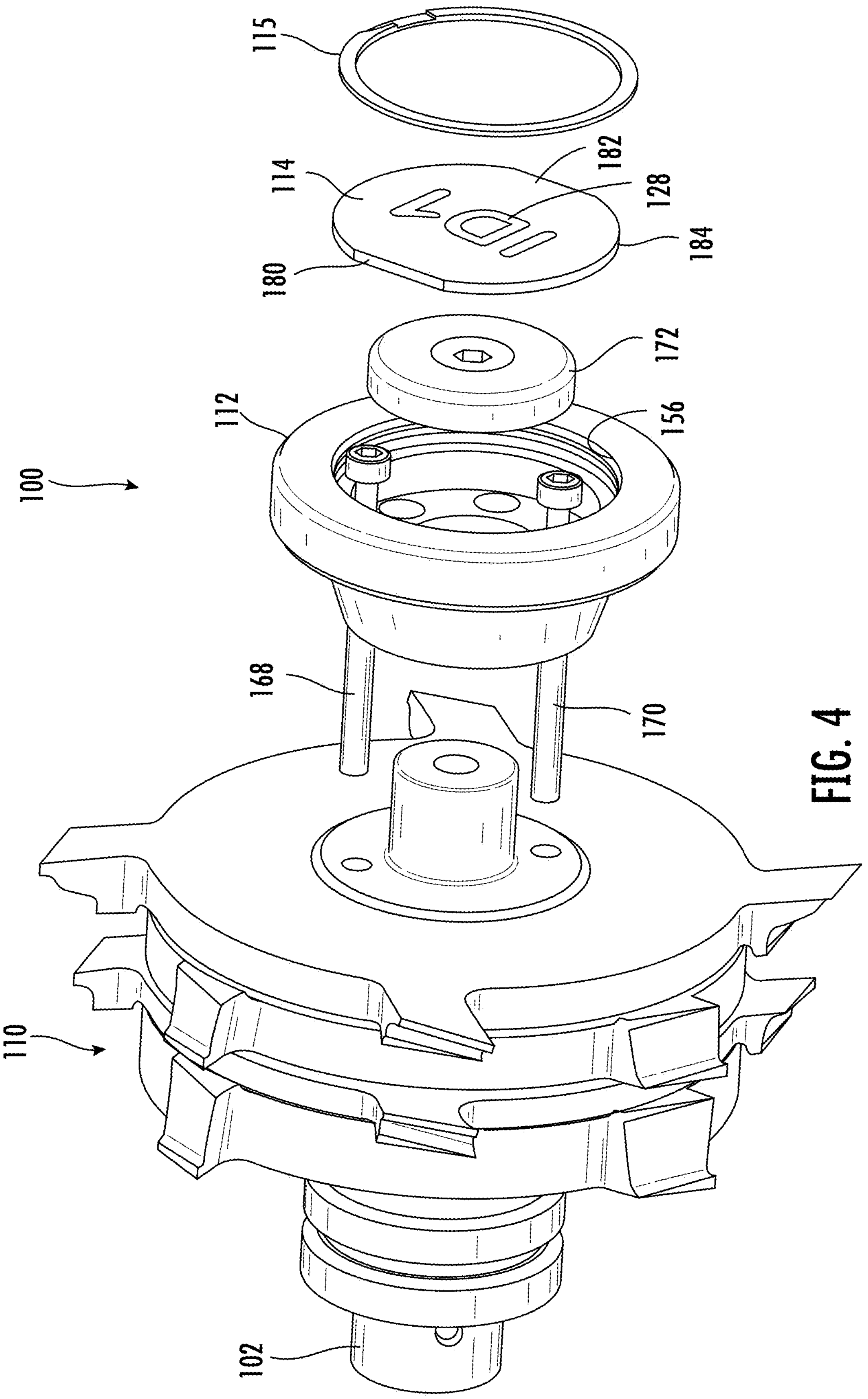
FIG. 4 is a partial assembly view of the apparatus of FIG. 1.

Turning now to FIG. 4, it can be readily appreciated the apparatus 100 is assembled with the high-speed rotary cutter head 110 being mounted to the shaft 102, followed by the endcap 112. Fasteners 168, 170 then secure the endcap 112 to the high-speed rotary cutter head 110. The shaft-cap 172 with its cap fastener (not illustrated) secure the endcap 112 to the shaft 102. The removable indicia plate 114 is inserted into the endcap 112 and is secured in place with the snap ring 159. Because the snap ring 159 is used, it can be readily appreciated that it can be inserted and removed as necessary to change out the removable indicia plate 114 as desired.

As such, a user is easily able to put a different removable indicia plate 114 with any indicia 128 to facilitate correct use of the apparatus 100. The removable indicia plate 114 may have straight portions 180, 182 so as to facilitate removal from the annular inner wall 156 that surrounds it by creating gaps between the outermost radial surface 184 of the removable indicia plate 114 and the annular inner wall 156 surrounding it. However, as discussed above, given the high speed of rotation, the indicia plate 114 must be balanced to permit proper balanced rotation.

Figure 5:
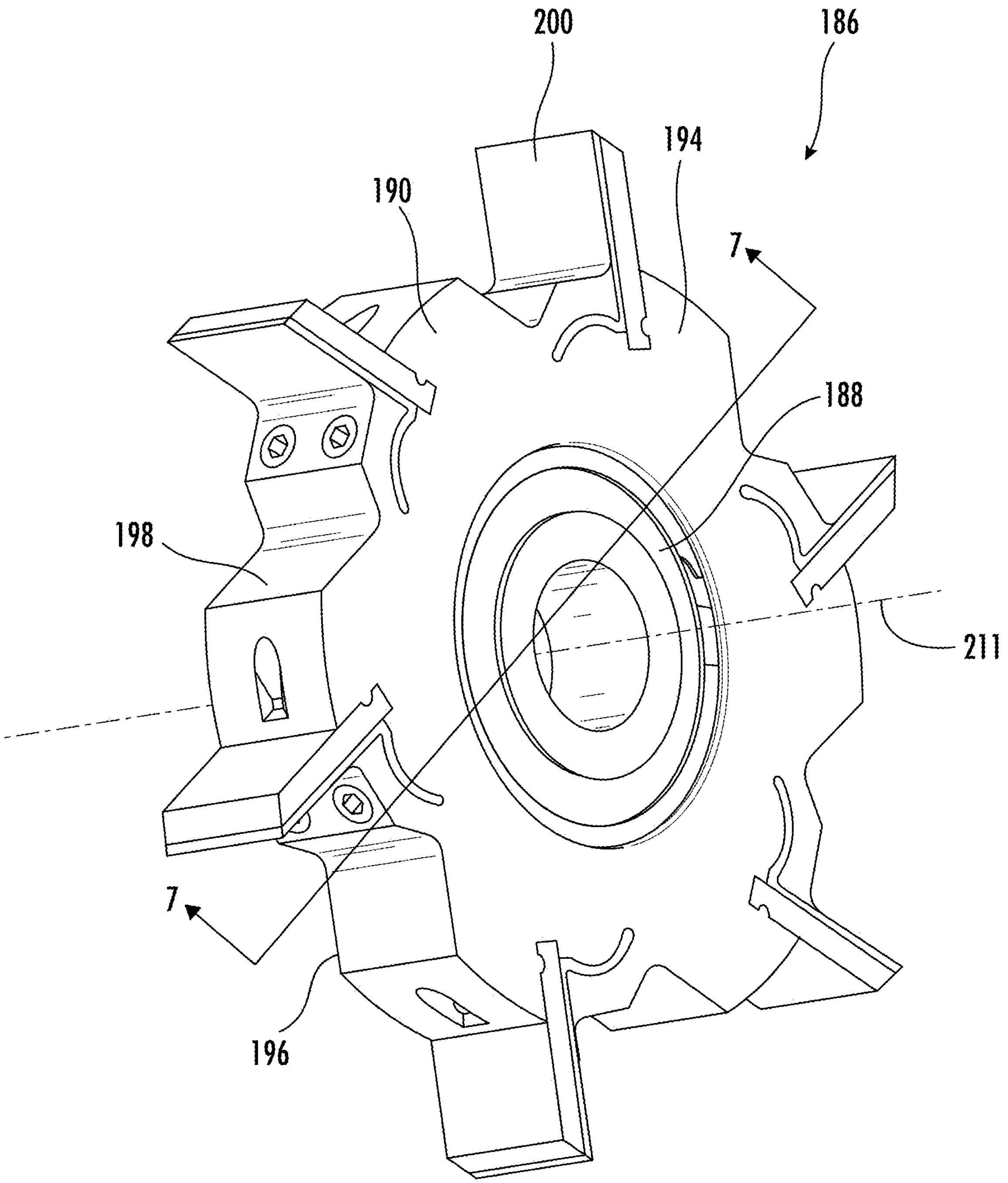
FIG. 5 is a perspective view of an embodiment of a rotary cutter head according to the teachings of the instant application.

FIG. 5 illustrates another embodiment of a rotary cutter head 186 having a removable indicia plate 188, but no endcap 112 (FIG. 1) and no shaft 102 (FIG. 1) as described with respect to the high-speed rotary cutter head 110 (FIG. 1). The removable indicia plate 188 is the same as the removable indicia plate 114 (FIG. 1) except for the differences described here.

The rotary cutter head 186 includes a cutter head body 190 oriented for rotation about a rotational axis 192. The cutter head body 190 includes a first face 194 also referred to a top face or first side. A second face 196 is on the opposite side of the first face 194 and is also referred to as a bottom face or a second side.

A cutter face 198 extends the entire perimeter or circumference around the cutter head body 190 between the first face 194 and the second face 196. The cutter face 198 may include a saw tooth profile for material removal of a part being machined by the rotary cutter head 186 or may also include cutting blades 200 for material removal.

Figure 6:
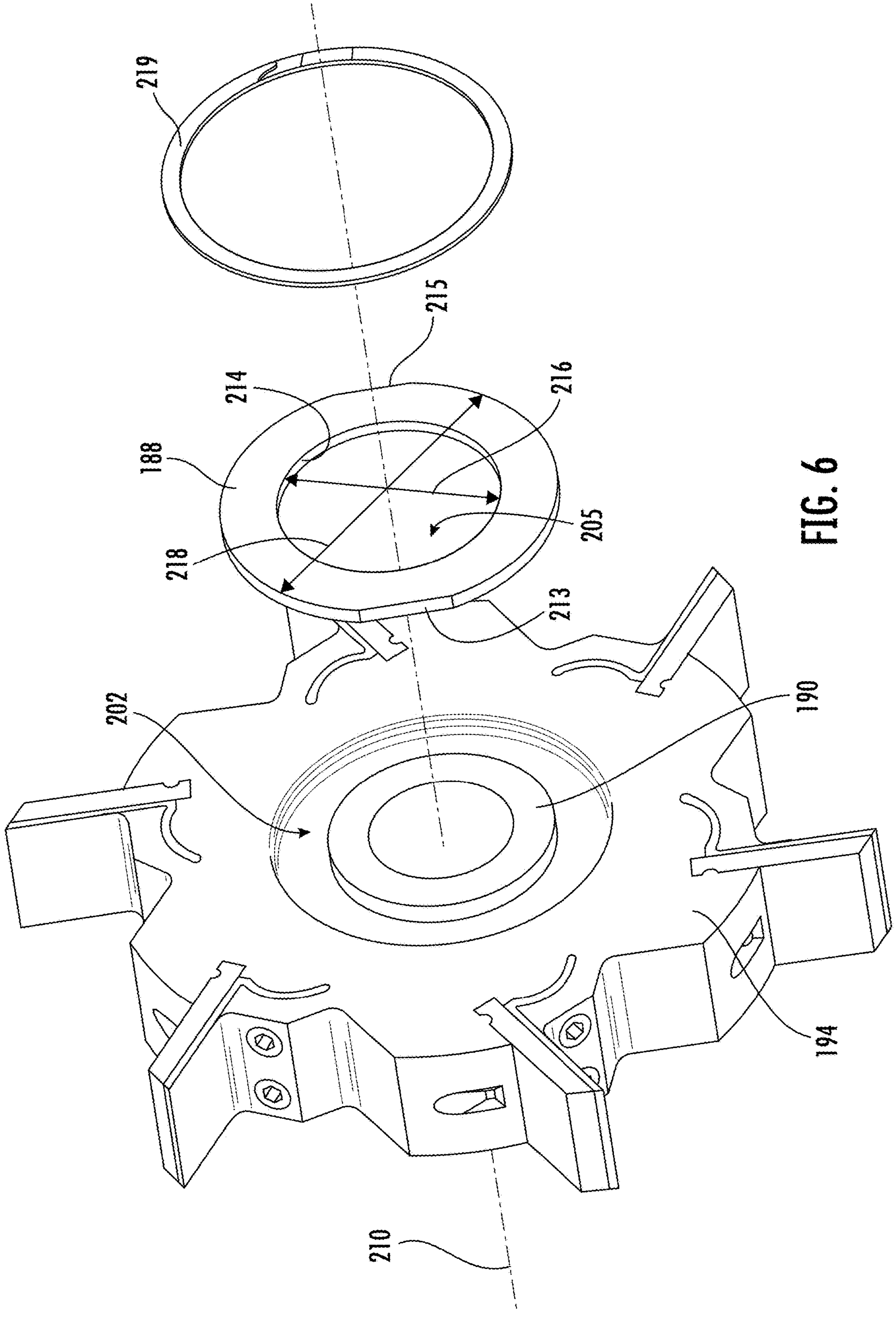
FIG. 6 is a partial assembly view of the rotary cutter head of FIG. 5.

As seen in FIG. 6, a recess 202 is defined in the first face 194. The recess 202 (FIG. 6) is a ring-shaped blind hole. The removable indicia plate 188 in the embodiment illustrated is substantially washer-shaped with a center through-hole 205. The outermost periphery of the removable indicia plate 188 may have opposed straight portions 213, 215 to facilitate insertion and removal in the recess 202. The removable indicia plate 188 is received in the recess 202 such that a first radial face 214 at an innermost diameter 216 of the removable indicia plate 188 is in contact with the cutter head body 190 in the recess 202. At least a portion of a second radial face 216 at a plate outermost diameter 218 of the removable indicia plate 188 is in contact with the cutter head body 190 in the recess 202.

Figure 7:
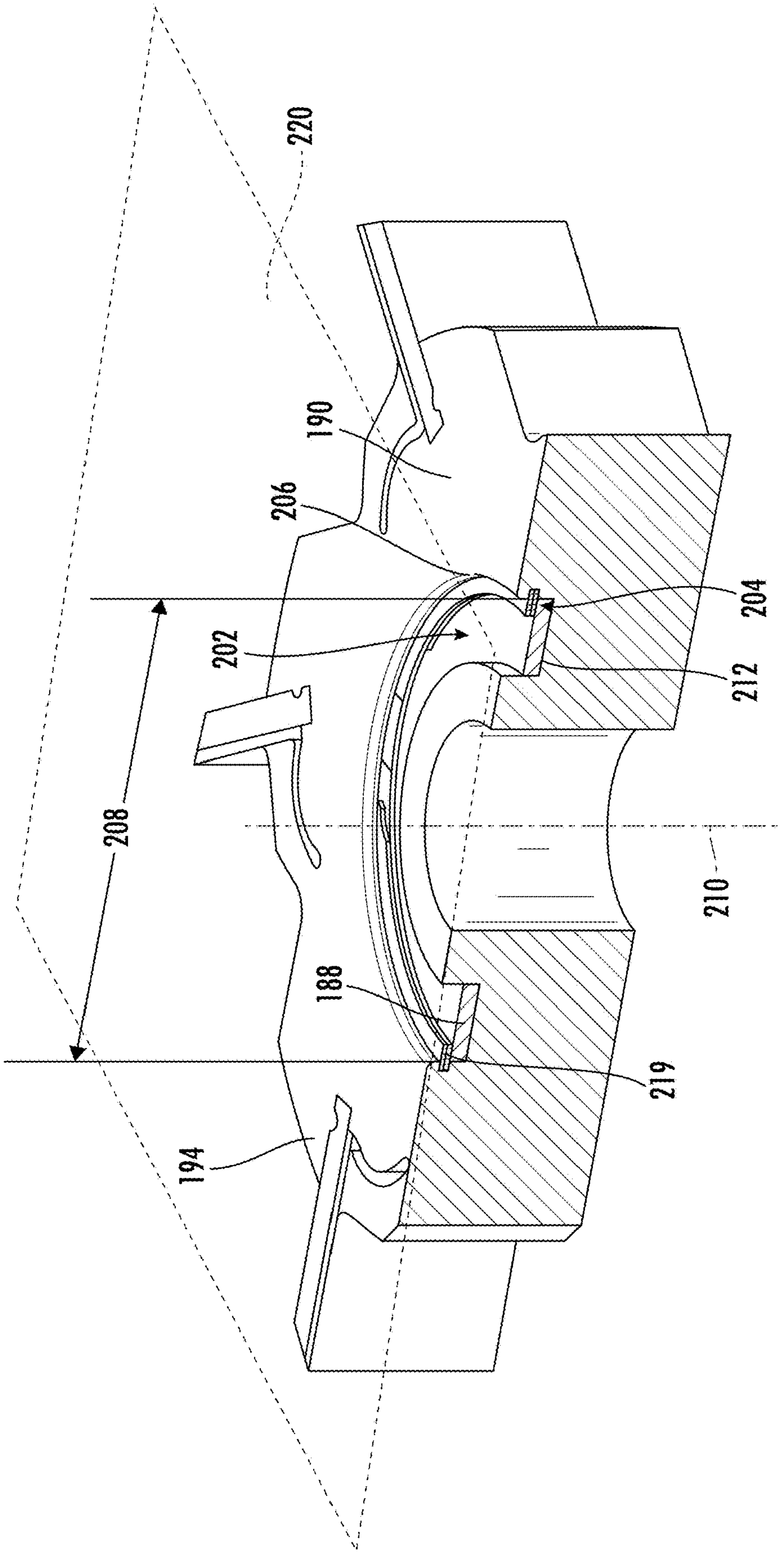
FIG. 7 is a cross section taken about line 7-7 of the rotary cutter head of FIG. 5.

As seen in FIG. 7, the recess 202 defines an annular channel 204 in an annular wall 206 of the cutter head body 190. The annular wall 206 is located at an outermost diameter 208 of the recess 202. The recess 202 defines a recess central axis 210. The recess central axis 210 lies along the rotational axis 211 (FIG. 5) of the rotary cutter head 186. A bottom 212 of the recess 202 acts as a bearing surface receiving the removable indicia plate 188.

Once the removable indicia plate 188 is seated on the bottom 212 of the recess 202, a retaining member 219 may be inserted into the annular channel 204 such that at least a portion of the retaining member 159 is received in the annular channel 204. Once seated in the recess 202 with the retaining member 159 in place, the removable indicia plate 188 is sandwiched between and in contact with the retaining member 219 which may be a snap ring and the bottom 212 of the recess 202. The first face 194 of the cutter head body 190 defines a plane 220 and the removable indicia plate 188 does not extend above or through the plane 220. The rotary cutter head 186 may be a high-speed rotary cutter head.

Figure 8:
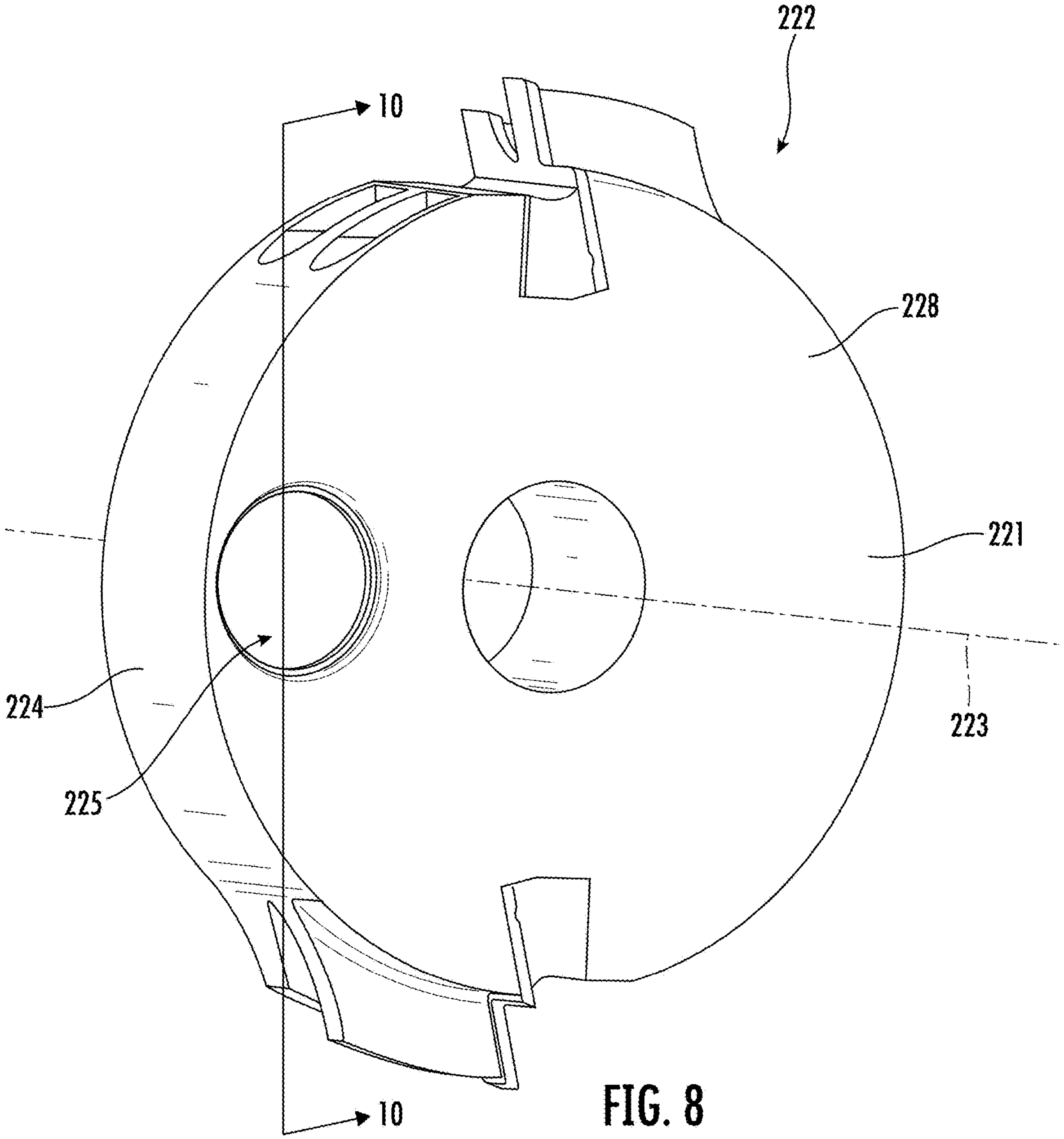
FIG. 8 is a perspective view of another embodiment of a rotary cutter head according to the teachings of the instant application.
Figure 9:
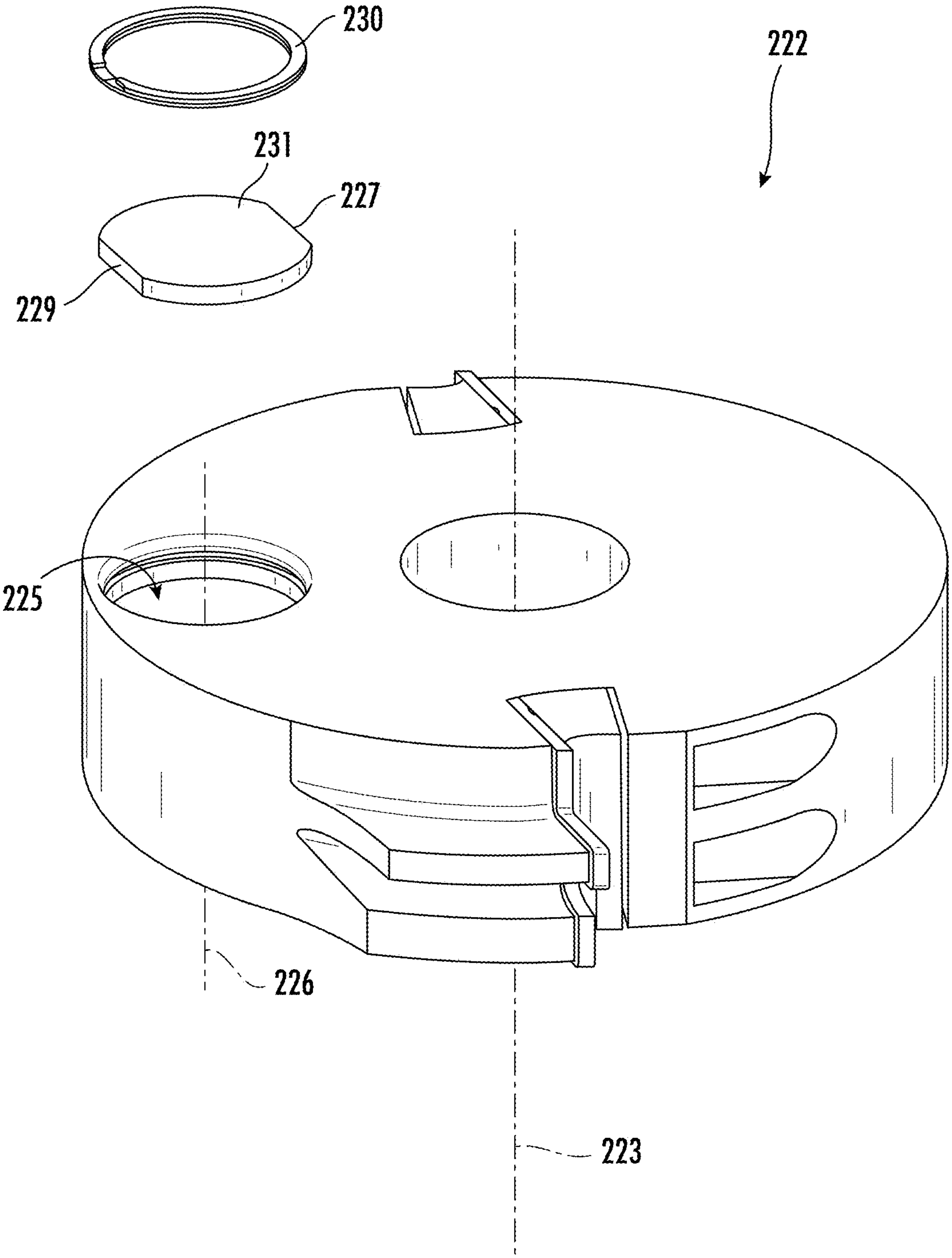
FIG. 9 is a partial assembly view of the rotary cutter head of FIG. 8.
Figure 10:
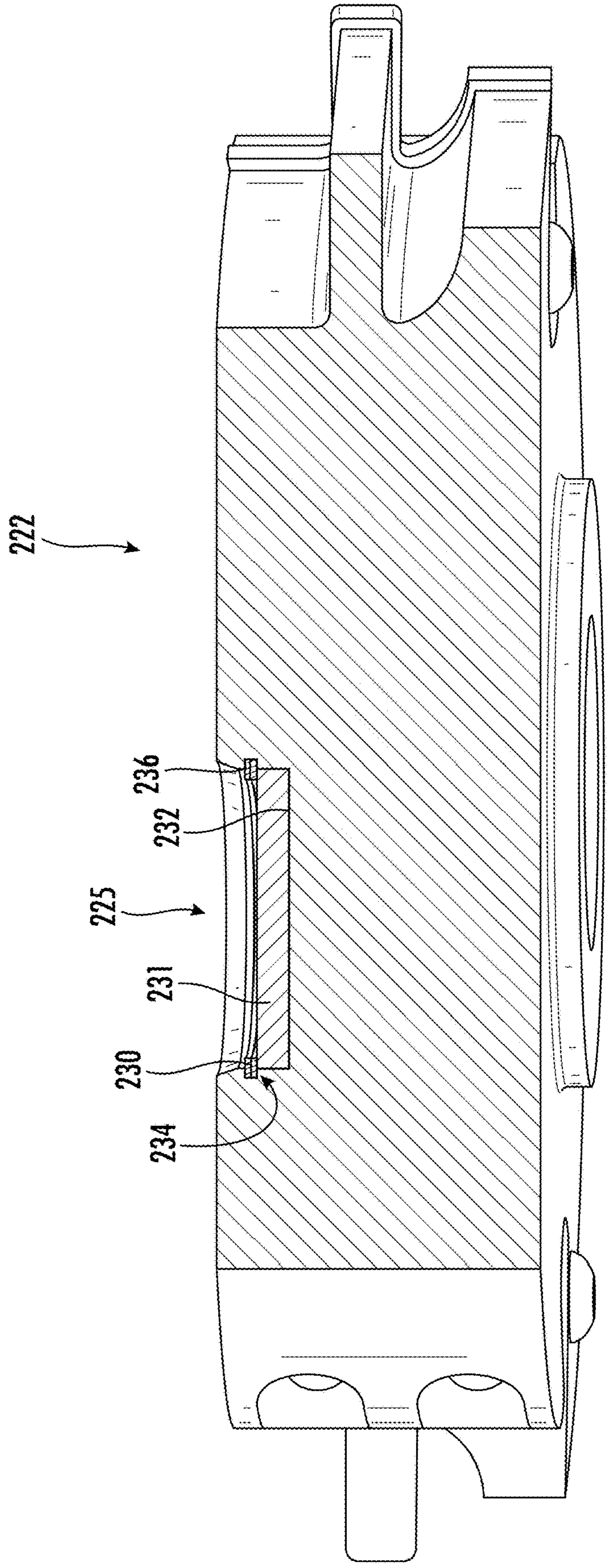
FIG. 10 is a cross section taken through line 10-10 of the rotary cutter head of FIG. 8.

FIGS. 8-10 illustrate another embodiment of a rotary cutter head 222. Rotary cutter head 222 is similar to rotary cutter head 186 (FIGS. 5-7) except that the recess 225 does not surround the rotational axis 223 of the rotary cutter head 222. Instead, the recess 225 is located between the rotation axis 223 and the cutter face 224. The recess 225 is defined in the top face 221 of the cutter head body 228. The recess 225 is not a ring-shaped, but instead is a disc-shaped blind hole.

As seen in FIG. 9, the removable indicia plate 231 is substantially disc-shaped with opposed straight portions 227, 229 to facilitate insertion and removal from the recess 225. The recess 225 defines a central axis 226. The central axis 226 is parallel to and spaced apart from the rotational axis 228 of the rotary cutter head 222. The retaining member 230 is a snap ring.

FIG. 10 illustrates the removable indicia plate 224 sandwiched between a bottom 232 of the recess 225 and the retaining member 230. The retaining member 230 has at least a portion received into an annular channel 234 in an annular wall 236 of the recess 225. Therefore, as with the other embodiments heretofore descried, to remove the removable indicia plate 224, the retaining member 230 is taken out of the annular channel 234, and then out of the recess 222. Thereafter, the removable indicia plate 224 is free of any retention in the recess 225 and can fall out of the recess 225 or be freely taken out of the recess 225. The rotary cutter head 222 may be a high-speed rotary cutter head.

Figure 11:
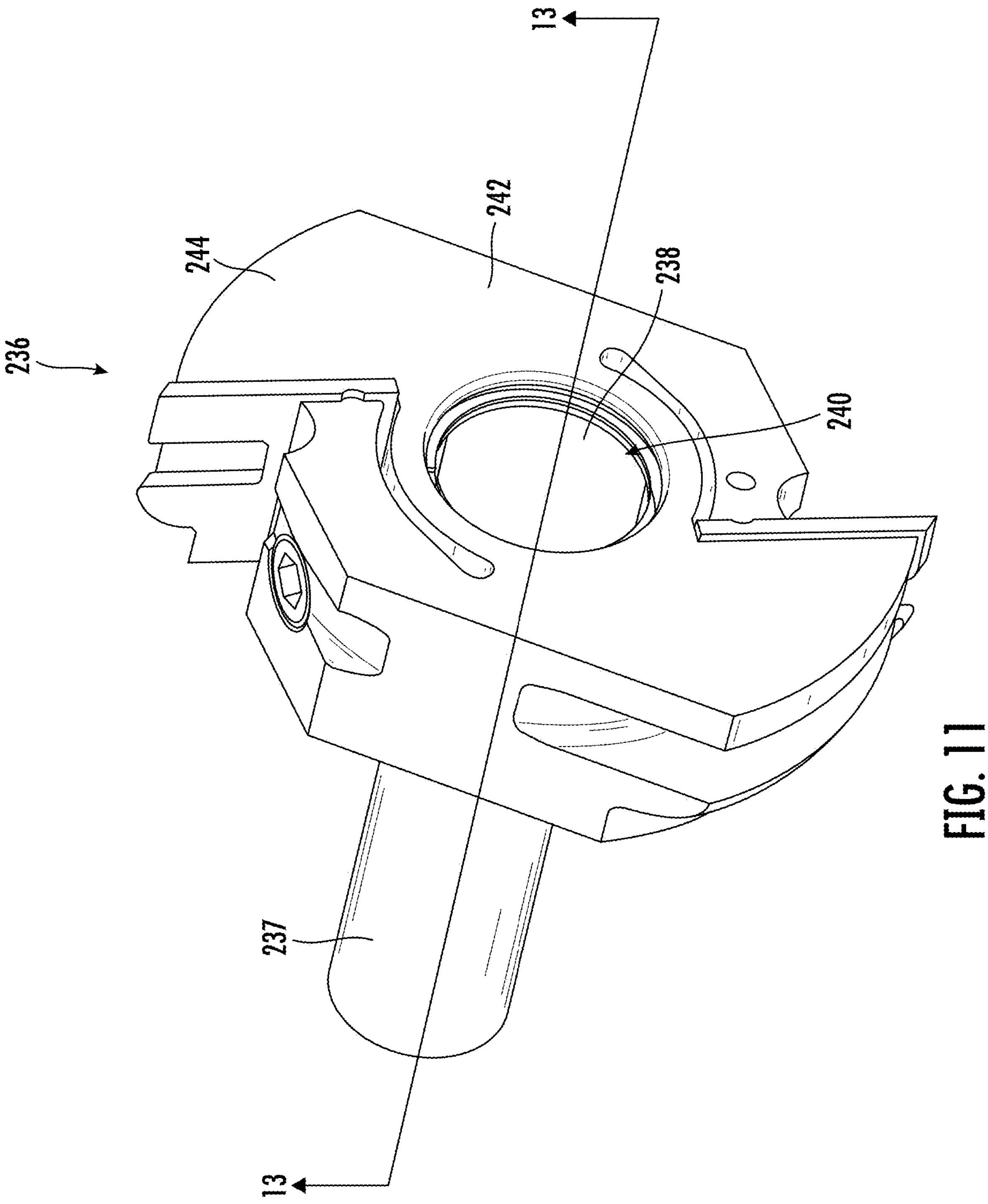
FIG. 11 is a perspective view of yet another embodiment of a rotary cutter head according to the teachings of the instant application.
Figure 12:
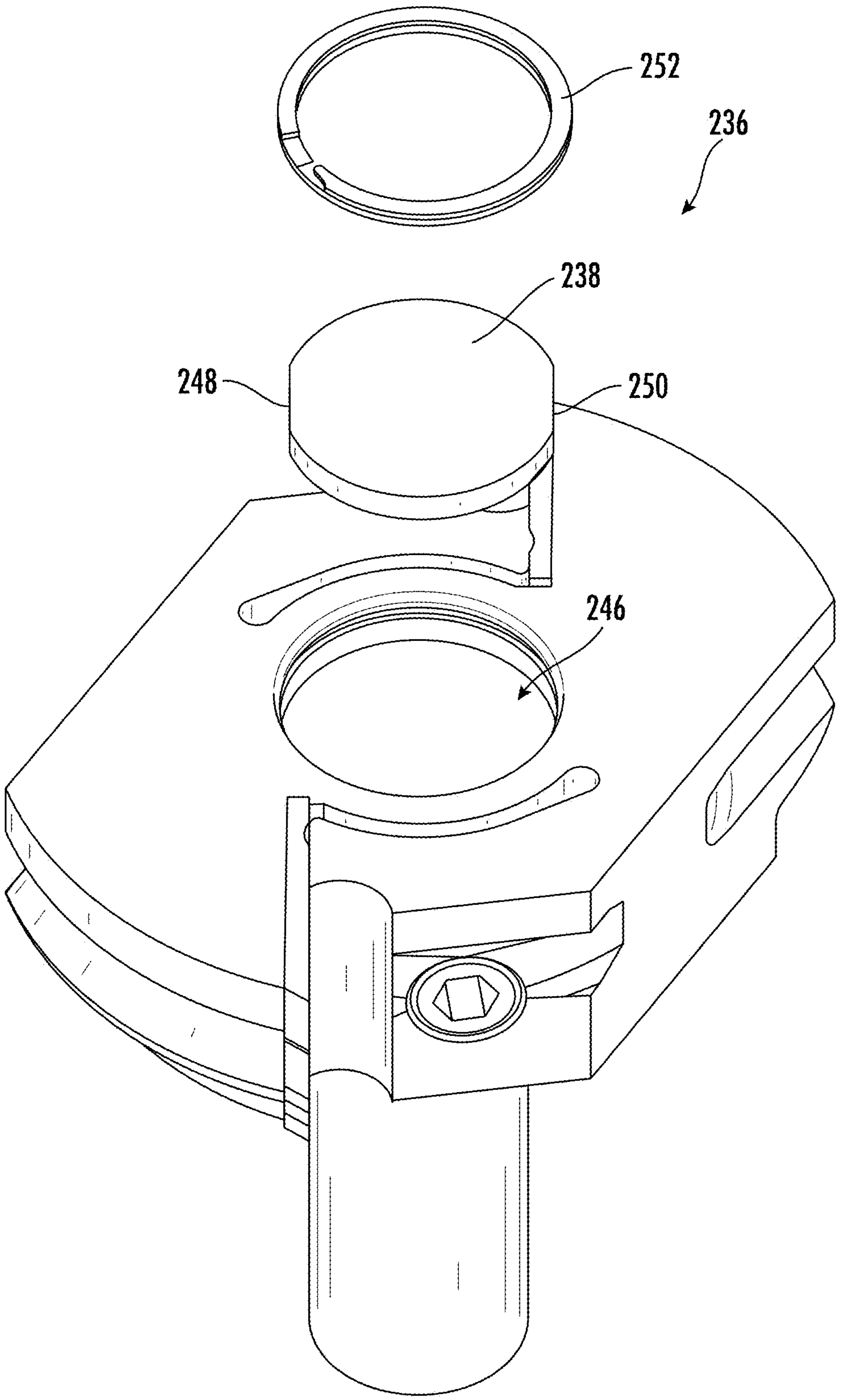
FIG. 12 is a partial assembly view of the rotary cutter head of FIG. 11.
Figure 13:
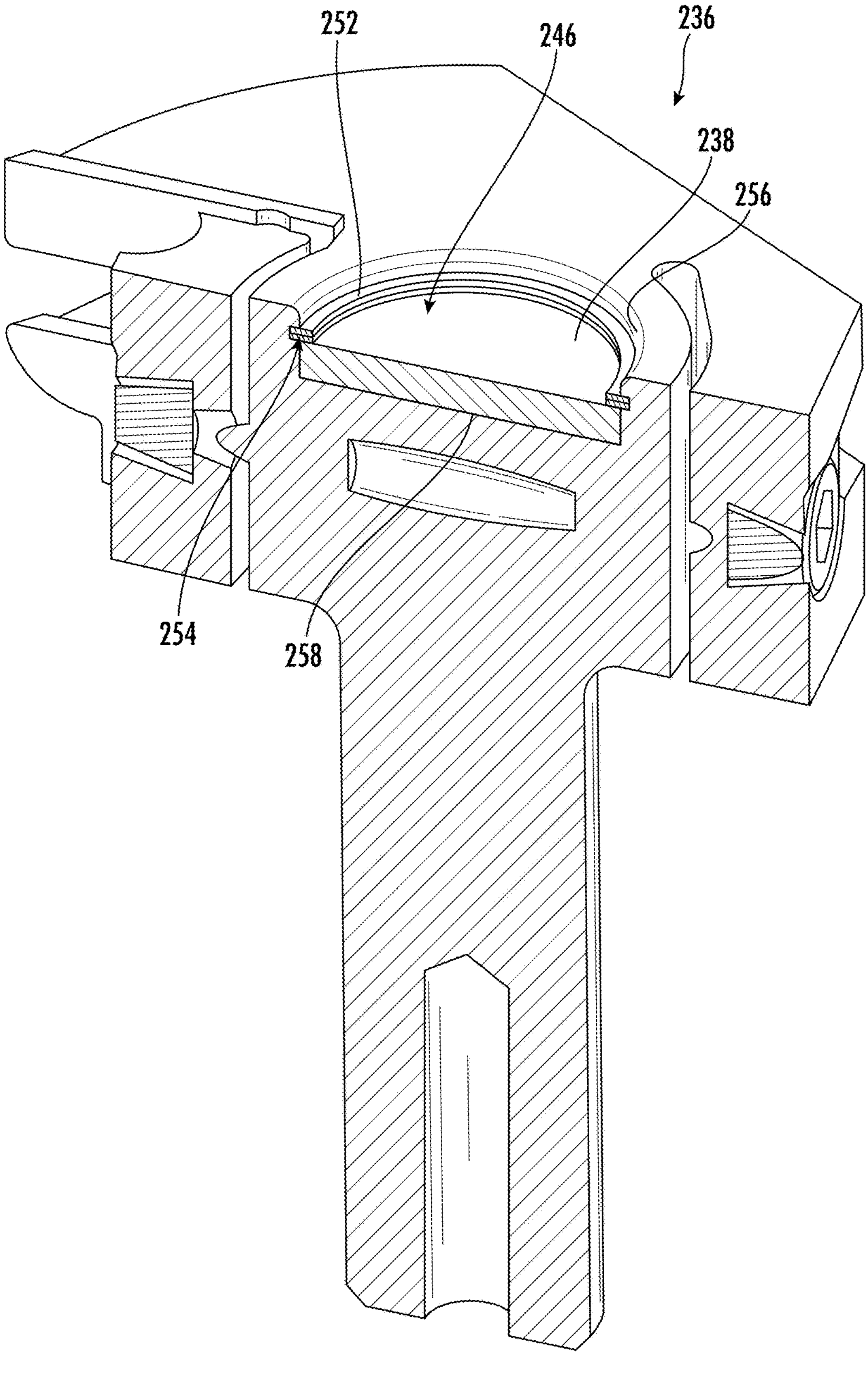
FIG. 13 is a cross section of the rotary cutter head of FIG. 11 taken about line 13-13.

FIGS. 11-13 illustrate another embodiment of a rotary cutter head 236 which is similar to apparatus 100 (FIG. 1) except that there is only one rotary cutter head 236 with shaft 237 instead of multiple rotary cutter heads. In this embodiment, instead of locating the removable indicia plate 114 (FIG. 1) in the endcap 112 (FIG. 1), the removable indicia plate 238 is in a recess 240 of the first face 242 of the cutter head body 244. Like recess 225 (FIG. 8), the recess 246 is disc-shaped.

As illustrated in FIG. 12, the removable indicia plate 238 is substantially disc-shaped with opposed straight portions 248, 250 to facilitate insertion and removal from the recess 246 of the rotary cutter head 236. The retaining member 252 is a snap ring.

FIG. 13 illustrates the removable indicia plate 238 seated in the recess 246 such that it is sandwiched between the retaining member 252 and a bottom 258 of the recess 246. The retaining member 252 has at least a portion received into annular channel 254 in annular wall 256 of the recess 246. The rotary cutter head 236 may be a high-speed rotary cutter head.

Figure 14:
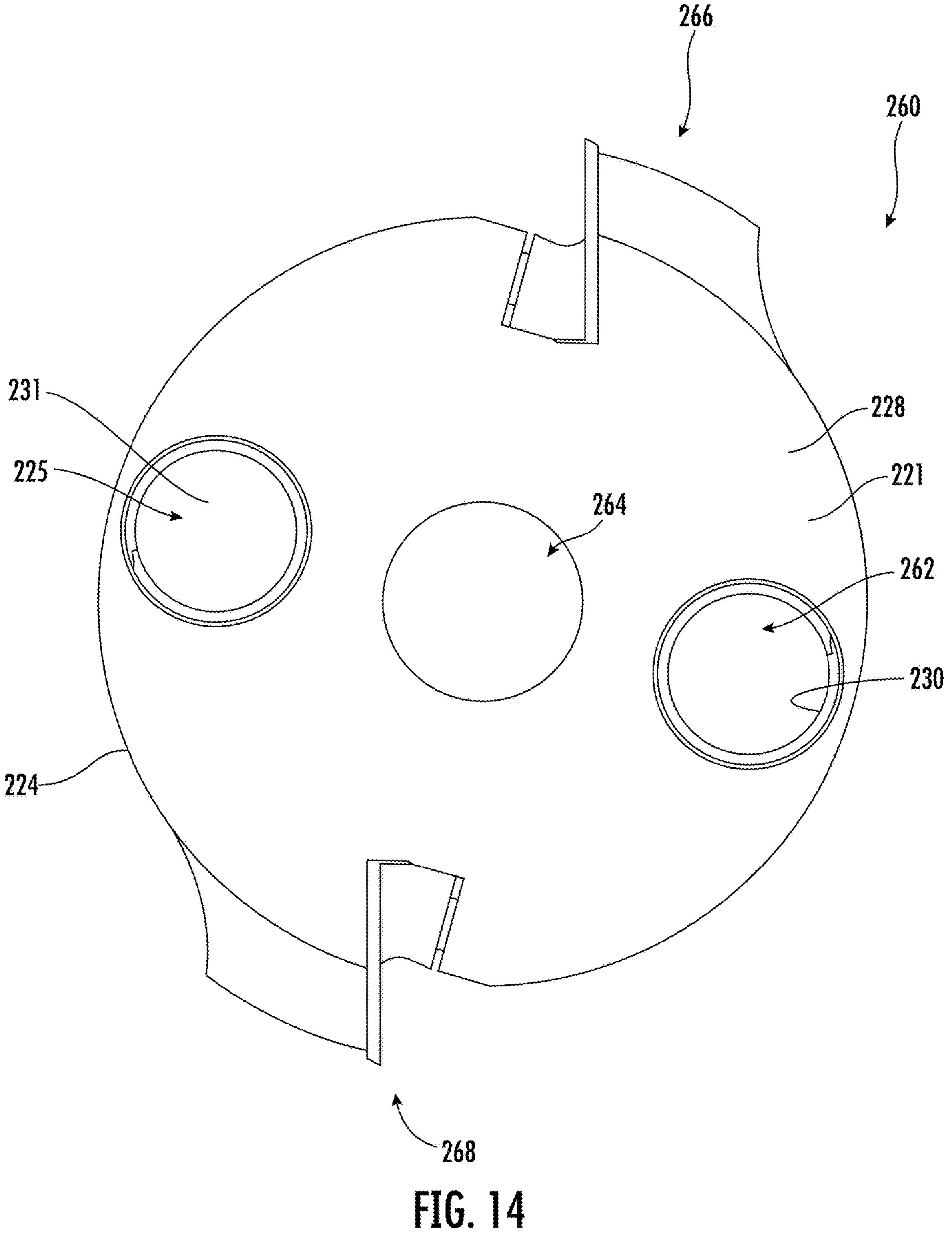
FIG. 14 is a perspective view of another embodiment of the rotary cutter head of FIG. 8 but having two recesses in a top surface and centered about the rotational axis of the rotational axis of the rotary cutter head according to the teachings of the instant application.

FIG. 14 illustrate another embodiment of a rotary cutter head 260 that is the same as rotary cutter head 222 (FIG. 8) except for the differences described here. In this embodiment, another recess 262 is located 180 degrees apart from recess 225 on the top face 221 to ensure balance of the rotary cutter head 260 for high-speed machining. Like recess 225, the another recess 262 includes the removable indicia plate 231 that is retained in the another recess with the retaining member 230 that is a snap ring.

Thus, the another recess 262 is also located between the cutter face 224 surrounding the cutter head body 228 and the center axis 223 of the through hole 264. The another recess 262 is spaced 180 degrees apart from recess 225 and on the other side of the rotational axis 223.

At this point in the disclosure, it is also readily appreciated that where the rotary cutter head has more than two cutting wings 266, 268, more than two recesses 225, 262, may be provided evenly spaced apart from one another and centered around the rotational axis 223. Indeed, FIG. 15 illustrates a rotary cutting head 268 having three cutting wings 270, 272, 274 and three recesses 276, 278, 280 which are the same as recess 225 (FIG. 9).

Figure 15:
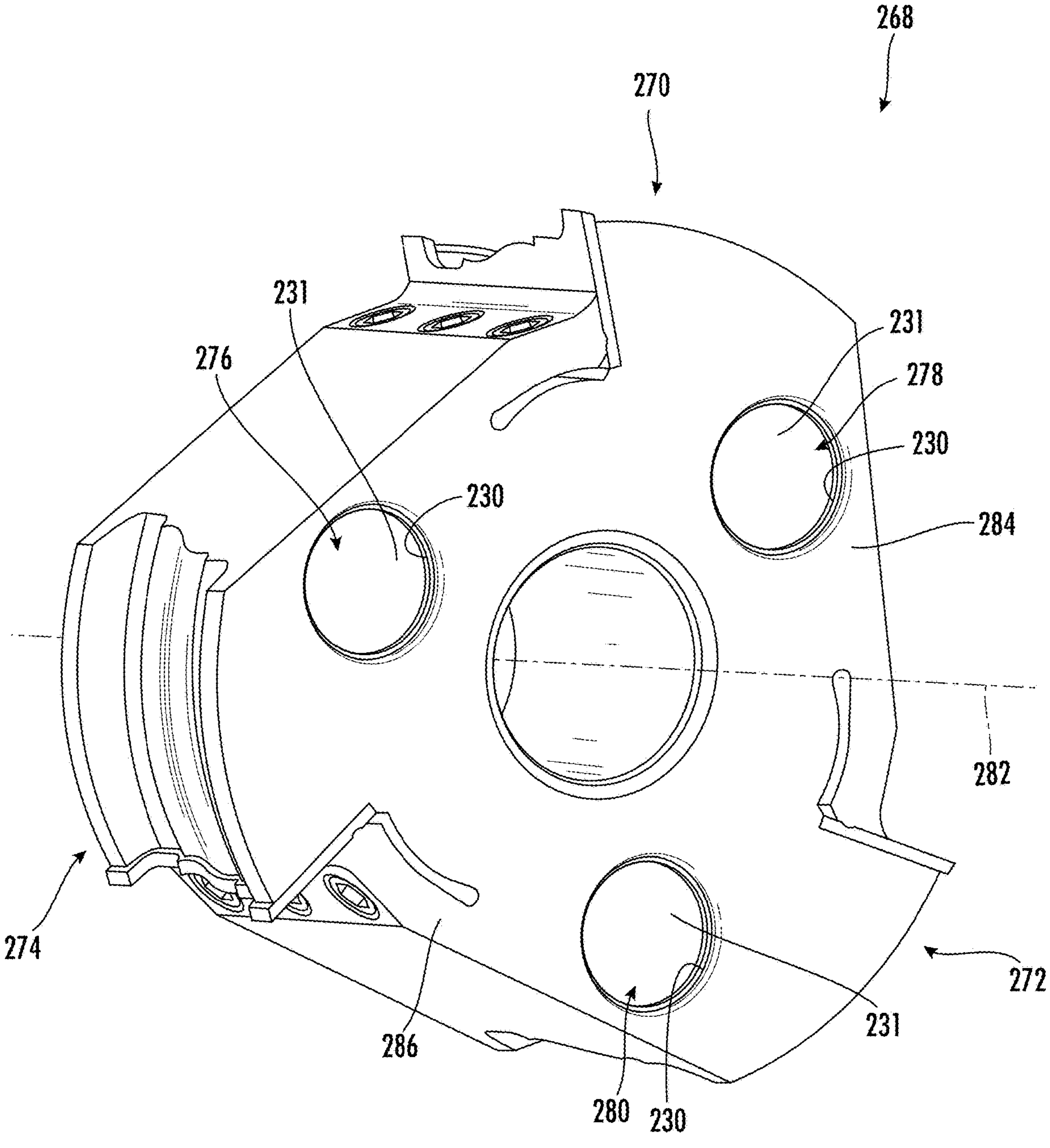
FIG. 15 is a perspective view of another embodiment of a rotary cutter head having a plurality of recesses in a top surface and centered about the rotational axis of the rotary cutter head.

Still with respect to FIG. 15, each recess 276, 278, 280 includes a removable indicia plate 231 that is retained by a retainer member 230. Thus, the rotary cutting head 268 is well balanced for high-speed machining with the recesses 276, 278, 280 evenly spaced around the rotational axis 282 of the rotary cutting head 268 and spaced apart from one another by 120 degrees on the top face 284 of the rotary cutter body 286. Again, as can be readily appreciated, a rotary cutting head having more that the three cutting wings 270, 272, 274 illustrated can having a plurality of recesses evenly spaced apart from one another and centered around the rotary cutter body 286 rotational axis 282 for a well balanced rotary cutting head for high-speed machining.

All references, including publications, patent applications, and patents cited herein, are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An apparatus comprising:

a shaft having a first end and a second end opposite the first end;

a high-speed rotary cutter head mounted on the shaft between the first end and the second end; and an endcap having a removable indicia plate mounted at the second end;

wherein the endcap comprises:

an endcap body defining a through-hole extending from a first open end of a first inner diameter to a second open end of a second inner diameter less than the first inner diameter;

an annular inner wall surrounding the through-hole defined by the endcap body:

an annular channel in the inner wall, the annular channel receiving at least a portion of a retaining member therein;

an annular first step defined in the annular inner wall, the annular first step sized to receive the removable indicia plate thereon; and an annular second step defined in the annular inner wall, the annular second step defining a plurality of mounting through-holes evenly spaced around a center axis of the through-hole of the endcap; wherein at least two fasteners extending through two mounting holes of the plurality of mounting holes secure the endcap to the high-speed rotary cutter head.

2. An endcap for a high-speed rotary cutter head mounted on a shaft for mounting to a machine tool, the endcap comprising:

an endcap body comprising:

an annular inner wall surrounding a through-hole defined by the endcap body;

an annular channel in the inner wall;

a retaining member;

a removable indicia plate;

wherein the removable indicia plate is mounted within the through-hole in the endcap body and is removably secured therein by the retaining member;

wherein the annular inner wall defines an annular first step, and wherein the retaining member is seated in the annular channel such that an annular portion of the retaining member is in the annular channel and another annular portion of the retaining member bears against the removable indicia plate to sandwich the removable indicia plate between the retaining member and the annular first step; and wherein an annular second step is defined in the annular inner wall, the annular second step defining a plurality of mounting through-holes evenly spaced around a center axis of the through-hole of the endcap body; wherein at least two fasteners extending through two mounting holes of the plurality of mounting holes secure the endcap to the high-speed rotary cutter head.

* * * * *